United States Patent
Launius, Jr.

(10) Patent No.: US 6,904,694 B2
(45) Date of Patent: Jun. 14, 2005

(54) BODY TOOL

(75) Inventor: William E. Launius, Jr., Millstadt, IL (US)

(73) Assignee: Derby Worx, Inc., Millstadt, IL (US)

( * ) Notice: Subject to any disclaimer, the term of this patent is extended or adjusted under 35 U.S.C. 154(b) by 0 days.

(21) Appl. No.: 10/659,132

(22) Filed: Sep. 11, 2003

(65) Prior Publication Data
US 2005/0055840 A1 Mar. 17, 2005

(51) Int. Cl.⁷ .................................................. G01B 3/14
(52) U.S. Cl. ........................ 33/562; 33/645; 33/626; 33/568; 33/573; 33/567; 33/567.1
(58) Field of Search .......................... 33/562, 203, 608, 33/645, 568, 569, 573, 626, 638, 567, 567.1, 567.11

(56) References Cited

U.S. PATENT DOCUMENTS

| 1,066,695 | A | * | 7/1913 | Ash | 33/562 |
| 2,636,279 | A | * | 4/1953 | Hilding | 33/567 |
| 2,821,022 | A | * | 1/1958 | Woodward | 33/567.1 |
| 3,914,871 | A | * | 10/1975 | Wolff | 33/562 |
| 4,035,099 | A | * | 7/1977 | Friederichs et al. | 33/638 |
| 4,421,442 | A | * | 12/1983 | Lindblad | 408/115 R |
| 4,445,276 | A | * | 5/1984 | Voneky et al. | 33/567 |
| 4,590,677 | A | * | 5/1986 | Kopp | 33/626 |
| 4,625,415 | A | * | 12/1986 | Diamontis | 33/562 |
| 4,752,162 | A | * | 6/1988 | Groh | 33/638 |
| 5,111,586 | A | * | 5/1992 | Huynh | 33/645 |
| 5,407,306 | A | * | 4/1995 | Klapperich | 408/115 R |
| 5,733,077 | A | * | 3/1998 | MacIntosh, Jr. | 408/103 |

* cited by examiner

Primary Examiner—Christopher W. Fulton
Assistant Examiner—Travis Reis
(74) Attorney, Agent, or Firm—Charles C. McCloskey

(57) ABSTRACT

The body tool has a rectangular shape with two projections and a central passage for a Pinewood Derby® car body. The holes in one projection align with the other projection. A child places a car body into the passage so the kerf for an axle aligns with the holes in the projections. Alternately, the body alignment tool has two jaws upon a threaded rod closed by a wing nut that grasp a car body. The child then drills through the holes and the car body to straighten the kerf to accept an axle. The child then removes the car body from the body tool and inserts an axle into the new kerf.

3 Claims, 2 Drawing Sheets

BODY TOOL

BACKGROUND OF THE INVENTION

1. Field of the Invention

The present invention relates to a body tool for use as a hand tool in connection with model cars. The body tool has particular utility in connection with drilling accurate axle holes.

2. Description of the Prior Art

As winter loosens its grip, children emerge from homes across the land for a contest: the Pinewood Derby®. For the derby, children and their adult sponsors assemble a wooden model car from a kit and then race their cars against those of fellow children upon a track with guideways for each car. Children that win local races advance to tournaments. In a car race, speed leads to victory and fractions of a second count. Children and sponsors seek to minimize wheel friction and to align wheels precisely at each opportunity. The wooden cars have four wheels. Each plastic wheel has a finished face, a rim, and a centered hub opposite the finished face. The hub fits over an axle hammered into the car. Spinning upon the axle, the wheel runs in the track.

Body tools are desirable for reaming an axle hole in a wooden car body with minimal risk of injury. The body tool works together with a drill bit and a drill. An axle hole becomes straight by a drill bit advanced through the axle hole while guided by the body tool. An axle placed in a straight axle hole parallels the axis of rotation of the wheel allowing the wheel complete contact with the track and not the guideway. Prior art designs straightened axle holes by visual observation and manual methods. Because of manual positioning of the drill bit, children still had imprecise axle holes for their cars and thus, slower cars. In summary, prior art requires a drill and the coordination of an adult while children sat out the fine-tuning of their cars for speed.

The present art overcomes the limitations of the prior art. That is, the art of the present invention allows children to ream straight axle holes. The present art further allows a more precise orientation of a wheel with the track.

The difficulty in straightening axle holes by children with minimal injury is shown by the operation of the typical method. From the factory, axle holes come from saw cuts—kerfs—and the kerf has slight imperfections. Installed in a kerf upon an as delivered car body, an axle will alter the toe and camber of the wheel adversely. The wheel makes incomplete contact with the track and the guideway, increasing friction and reducing the speed of the car. Typically, sponsors straighten axle holes by hand and eye with a power drill. A sponsor would clamp the wooden car and align a drill bit with the axle hole by sight. Then the conventional method requires a sponsor to hold the drill straight as it passes through the kerf. Such a manual method may not accurately straighten the axle hole and may result in injuries to sponsors or children. The present invention overcomes this difficulty.

The use of reaming jigs is known in the prior art. For example, U.S. Pat. No. 6,254,320 to Weinstein et al. discloses a fixture for drilling pocket holes. However, the Weinstein '320 patent does not drill across the full thickness of a board, and has further drawbacks of asymmetrical shape and lack of alignment markings.

U.S. Pat. No. 4,955,766 to Sommerfeld discloses a holding fixture for drilling pocket joints. However, the Sommerfeld '766 patent does not grasp a board with a U shaped body, and additionally does not drill across the full thickness of a board.

Similarly, U.S. Pat. No. 5,733,077 to MacIntosh discloses a lens drill guide that prepares an eyeglass lens to accept a frame. However, the MacIntosh '077 patent does not have alignment markings, and cannot grasp a lens snugly between the legs alone.

Similarly, U.S. Pat. No. 4,421,442 to Lindblad discloses a doweling jig that adjusts to fit the thickness of two boards. However, the Lindblad '442 patent does not guide a drill bit across the lateral axis of a board, and cannot have a single jaw embodiment.

Similarly, U.S. Pat. No. 4,583,889 to Fallon discloses a jig for locating drilling holes in wood panels. However, the Fallon '889 patent does not grasp a board snugly without a clamp, and cannot drill through the endpiece.

Similarly, U.S. Pat. No. 3,053,121 to Proctor discloses a drill guide that centers on boards of varying thickness. However, the Proctor '121 patent does not have a fixed width between clamping plates, and cannot drill through the housings.

Similarly, U.S. Pat. No. 5,590,986 to Juang discloses a drill jig for locating holes to be drilled in a workpiece. However, the Juang '986 patent does not have a single piece generally U shaped, and cannot guide a drill bit on the longitudinal axis of the jig. Similarly, U.S. Pat. No. 4,492,498 to Kaufman discloses a drill bit jig that clamps upon a workpiece. However, the Kaufman '498 patent does not drill across the full thickness of a board, and cannot drill between the end plates.

Lastly, U.S. Pat. No. 4,158,523 to Schotzko discloses a miter box and frame doweling jig apparatus that drills dowel holes into the ends of boards. However, the Schotzko '523 patent does not drill across the thickness of a board, and has the additional deficiency of a separate clamp.

While the above-described devices fulfill their respective, particular objectives and requirements, the aforementioned patents do not describe a body tool that allows drilling accurate axle holes. The Weinstein '320, Sommerfeld '766, Lindblad '442, and Kaufman '498 patents make no provision for drilling across the full thickness of a workpiece. The MacIntosh '077 patent makes no provision for grasping a workpiece snugly. The Fallon '889 and Schotzko '523 patents require a clamp to grasp a workpiece. However, the Proctor '121 patent lacks a fixed width between clamping plates. Then, the Juang '986 patent lacks a U shape.

Therefore, a need exists for a new and improved body tool that can be used for drilling accurate axle holes. In this regard, the present invention substantially fulfills this need. In this respect, the body tool according to the present invention substantially departs from the conventional concepts and designs of the prior art, and in doing so provides an apparatus primarily developed for the purpose of drilling accurate axle holes.

SUMMARY OF THE INVENTION

In view of the foregoing disadvantages inherent in the known types of reaming jigs now present in the prior art, the present invention provides an improved body tool, and overcomes the above-mentioned disadvantages and drawbacks of the prior art. As such, the general purpose of the present invention, which will be described subsequently in greater detail, is to provide a new and improved body tool and method which has all the advantages of the prior art mentioned heretofore and many novel features that result in a body tool which is not anticipated, rendered obvious, suggested, or even implied by the prior art, either alone or in any combination thereof To attain this, the present invention essentially comprises a body, a pair of projections, and a passage. The body has a generally rectangular shape, two mutually parallel ends parallel to the lateral axis of the body, and two mutually parallel sides parallel to the longitudinal axis of the body. The pair of projections have a generally rectangular shape extending along with each of the ends perpendicular to the longitudinal axis of the body, a length less than half that of the body, a means to align, and form a generally U shape in combination with the body. The passage has boundaries from the projections and a generally rectangular shape. A model car fits snugly within the passage, a drill bit enters the aligning means and the model car, and then, the drill bit reams an axle hole in the model car. A drill chuck holds the drill bit during use.

Alternatively, the body tool for model cars has two jaws, a means to adjustably connect the jaws, and a passage. The jaws each have a generally rectangular shape, two mutually parallel ends parallel to the lateral axis of the jaw, and two mutually parallel sides parallel to the longitudinal axis of the jaw, a projection having a generally rectangular shape extending from one end and perpendicular to the longitudinal axis of the body, a length less than half that of the jaw, and a means to align. The means to adjustably connect the jaws places the projections opposite each other and permits closing the jaws upon one another. The passage has boundaries formed by the projections and a generally rectangular shape. A model car fits within the passage, the jaws close via the connecting means upon the model car, a drill bit enters the aligning means and the model car, and then, the drill bit reams an axle hole in the model car.

There has thus been outlined, rather broadly, the more important features of the invention in order that the detailed description thereof that follows may be better understood and in order that the present contribution to the art may be better appreciated.

The invention may also include markings upon the projections to align the body tool with axle holes and grooves as markings; holes as aligning means and countersunk for a drill chuck; aluminum as the gauge material; and jaws closed upon a threaded rod with a wing nut. Additional features of the invention will be described hereinafter and which will form the subject matter of the claims attached.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and the scope of the present invention.

It is therefore an object of the present invention to provide a new and improved body tool that has all of the advantages of the prior art reaming jigs and none of the disadvantages.

It is another object of the present invention to provide a new and improved body tool that may be easily and efficiently manufactured and marketed.

An even further object of the present invention is to provide a new and improved body tool that has a low cost of manufacture with regard to both materials and labor, and which accordingly is then susceptible of low prices of sale to the consuming public, thereby making such body tool economically available to children and their sponsors.

Still another object of the present invention is to provide a new body tool that provides in the apparatuses and methods of the prior art some of the advantages thereof, while simultaneously overcoming some of the disadvantages normally associated therewith.

Even still another object of the present invention is to provide a body tool for drilling accurate axle holes. This allows perpendicular installation of an axle upon a model car body. A perpendicular axle provides a wheel with flat contact to the track. Perpendicular front and rear axles allow a model car to roll straight and to increase speed.

Still yet another object of the present invention is to provide a body tool for drilling accurate axle holes. The markings make it possible to align the tool to the kerf without looking through the aligning means.

Still yet another object of the present invention is to provide a body tool for drilling accurate axle holes. This makes it possible to grasp the tool and the car body in one hand.

Lastly, it is an object of the present invention to provide a new and improved method of aligning axle holes in model cars, the steps comprising: 1) placing a gauge upon the model car; 2) locating the gauge proximate to an axle hole of the model car; 3) positioning markings of the projections of the gauge at the axle hole; and, 4) inserting a drill bit through a hole in the projection, into the axle hole, and into a hole in an opposite projection, thereby reaming the axle hole.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof Such description makes reference to the annexed drawings wherein.

The same reference numerals refer to the same parts throughout the various figures.

DESCRIPTION OF THE PREFERRED EMBODIMENT

Figure 1:
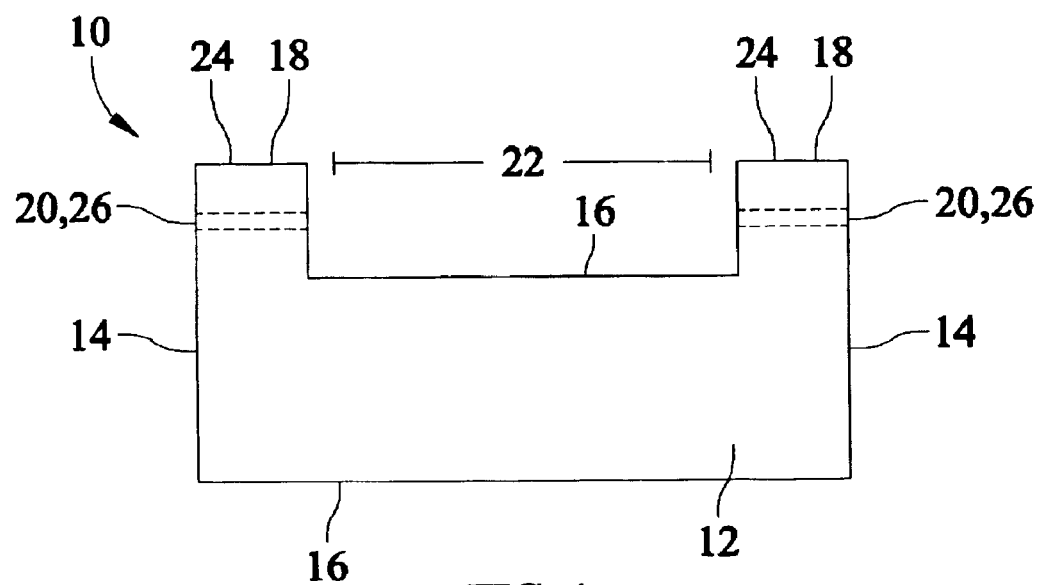
FIG. 1 is an elevation view of the preferred embodiment of the body tool constructed in accordance with the principles of the present invention.
Figure 2:
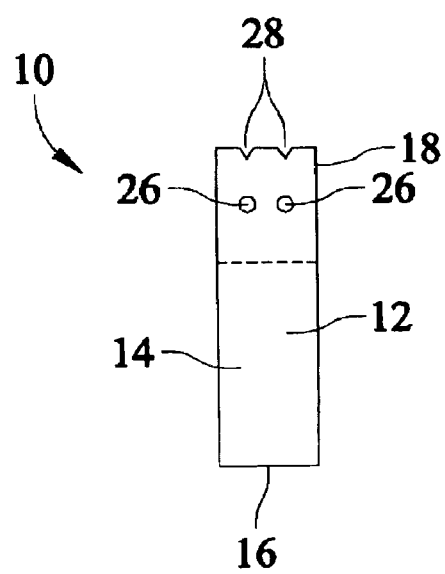
FIG. 2 is an end view of the body tool of the present invention.
Figure 3:
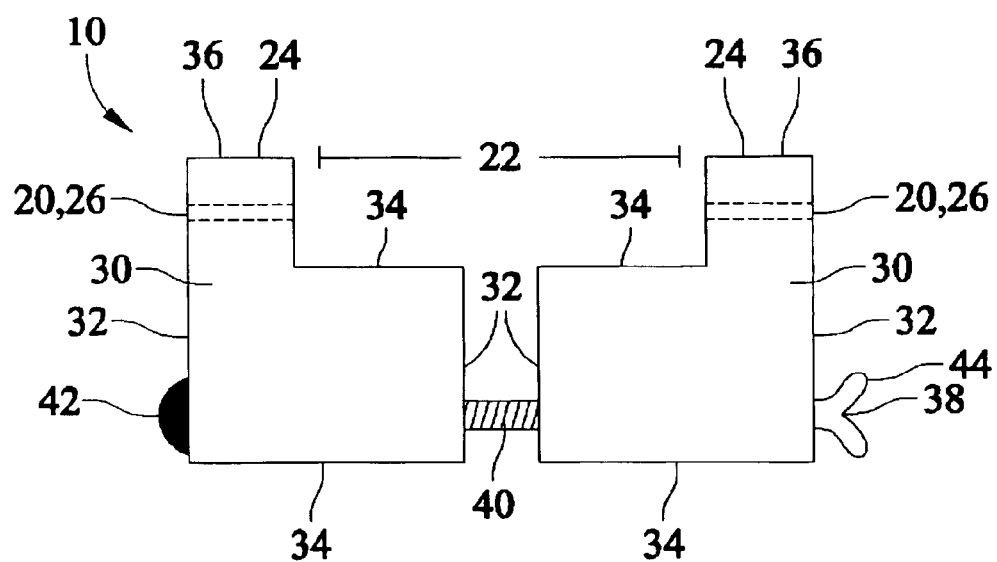
FIG. 3 is an elevation view of an alternate embodiment of the body tool of the present invention.

Referring now to the drawings, and particularly to FIGS. 1–3, a preferred embodiment of the body tool of the present invention is shown and generally designated by the reference numeral 10.

In FIG. 1, a new and improved body tool 10 of the present invention for drilling accurate axle holes is illustrated and will be described. More particularly, the body tool 10 has a body 12, two projections 18, and a passage 22 within the projections 18. The body 12 has a generally rectangular symmetrical shape with two mutually parallel ends 14 also parallel to the lateral axis of the body tool 10 and two mutually parallel sides 16 also parallel to the longitudinal axis of the body tool 10. One projection 18 extends from each end 14 with both projections 18 mutually parallel and upon the same side 16 of the body tool 10. The projections 18 have an individual length less than half the length of the body tool 10. Each projection 18 has a generally rectangular shape and a means to align 20. The aligning means 20 are coaxial between the two projections 18. A passage 22 to admit a model car body forms between the two projections 18 and the passage 22 snugly fits a car body. The aligning means 20 is away from the side 16 of the body 12 a sufficient distance to meet Pinewood Derby® regulations. The body tool 10 is generally aluminum.

Turning to FIG. 2, the body 12 has a projection 18 extending from the side 16 at each end 14. The projection 18 is coplanar with an end 14. The aligning means 20 within the projection 18 takes the form of one or more holes 26. The holes 26 pass through the projection 18 and the holes 26 of the two projections 18 align on the same axis. The holes 26 are parallel to the longitudinal axis of the body tool 10 and have a diameter sized for the typical model car axle. In an alternate embodiment, the holes 26 are countersunk upon the projection 18 coplanar with the end 14 of the body 12. A countersink guides a drill chuck should it contact the projection 18 inadvertently. Upon the projections 18 outward from the holes 26 and from the side 16 of the body tool 10, markings 24 denote the path of the holes 26. The markings 24 are parallel and coplanar with the holes 26. Children and sponsors use the markings 24 to align the holes to the kerf or new axle hole location in the model car body. In the preferred embodiment, the markings 24 are grooves 28 in the projections 18.

An alternate embodiment of the body tool 10 appears in FIG. 3. To accommodate model car bodies of a variety of widths, two jaws 30 close upon a model car body. Each of the jaws 30 has a generally rectangular shape, two mutually parallel ends 32 parallel to the lateral axis of the jaw 30, and two mutually parallel sides 34 parallel to the longitudinal axis of the jaw 30, a projection 36 having a generally rectangular shape extending coplanar with an end 32 perpendicular to the longitudinal axis of the body 12, a length less than half that of the jaw 30, and a means to align 20. The aligning means 20 are coaxial between the two projections 36. A passage 22 to admit a model car body forms between the two projections 36 and the passage 22 snugly fits a car body. The aligning means 20 is away from the side 34 of a jaw 30 a sufficient distance to meet Pinewood Derby® regulations.

The body tool 10 has a means to adjustable connect 38 the jaws 30 with the projections 36 opposite each other. The connecting means 38 is a threaded rod 40 that passes through both jaws 30 on an axis parallel to the longitudinal axis of the body tool 10. The threaded rod 40 has a head 42 at one jaw 30 and an opposite wing nut 44 at the second jaw 30. An adjustable width passage 22 forms between the two projections 36 to fit a model car body. Turning the wing nut 44 adjusts the position of the jaws 30 upon a model car body. Akin to FIGS. 1 & 2, the aligning means 20 in the alternate embodiment is one or more holes 26 through each projection 36. The holes 26 are coaxial between the projections 36 of the jaws 30 and parallel to the longitudinal axis of the body tool 10. Upon the projections 36 outward from the holes 26 and from the side 34 of the body tool 10, markings 24 such as grooves 28 denote the path of the holes 26. The markings 24 are parallel and coplanar with the holes 26. Children and sponsors use the markings 24 to align the holes to the kerf or new axle hole location in the model car body.

In use, it can now be understood that a child or sponsor traces the factory kerf or desired axle locations as lines up the sides of a wooden model car. The child then places the body tool 10 upon the model car body. The model car body fits within the passage 22 between the projections 18, 36. The child orients the model car so the factory kerf is within the passage 22 and at the side 16 of the tool 10. The traced lines of the kerf or axle hole location extend above the projections 18, 36 and permit the child to position the tool by aligning the markings 24 with the traced lines. Next, the child places a drill bit in a hole 26 of the aligning means 20. The child or sponsor turns the drill bit by a drill and advances the drill bit through the width of the model car. Thus the child straightens the kerf to ream an axle hole in the model car.

While a preferred embodiment of the body tool has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. For example, any suitable sturdy material such as steel, metal alloy, plastic, or composite may be used instead of the aluminum tool described. Although drilling accurate axle holes has been described, it should be appreciated that the body tool herein described is also suitable for checking the width of a model car body. Furthermore, a wide variety of markings may be used instead of the grooves described.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A hole alignment gauge for model cars guiding a drill bit into axle holes for reaming the same, comprising:

a body having a generally rectangular shape, two mutually parallel ends parallel to the lateral axis of said body, and two mutually parallel sides parallel to the longitudinal axis of said body;

a pair of projections having a generally rectangular shape extending coplanar with each of said ends perpendicular to the longitudinal axis of said body, a length less than half that of said body, said projections form a U shape, and a means to align;

said projections having one or more engraved grooves upon each of said projections and away from said body, parallel to the longitudinal axis of said body and to said aligning means, and visible directly above said aligning means;

said aligning means having one or more parallel spaced apart non-threaded round holes matching and generally centered in each of said projections and parallel to the longitudinal axis of said body, said holes having a diameter to receive a drill bit snugly, and said holes are located away from the center of said body to match existing axle holes in said model car; and, a passage bounded by said projections having a generally rectangular shape, and said model car fits snugly within said passage whereby said protections position an axle hole coaxial with said aligning means and a drill bit enters said aligning means and then an axle hole of the model car.

2. The hole alignment gauge of claim 1 wherein said passage is 1.75 inches in width.

3. A hole alignment gauge for model cars, having a body of a generally rectangular shape with two mutually parallel ends parallel to the lateral axis of said body, and two mutually parallel sides parallel to the longitudinal axis of said body; a pair of projections having a generally rectangular shape extending coplanar with each of said ends perpendicular to the longitudinal axis of said body, a length less than half that of said body, said projections form a U shape, and a means to align; and, a passage bounded by said projections having a generally rectangular shape and fixed width of 1.75 inches where a model car fits snugly within said passage, said gauge guiding a drill bit into axle holes of said model car for reaming the same, wherein the improvement comprises;

said projections having one or more engraved grooves upon each of said projections and away from said body, parallel to the longitudinal axis of said body and to said aligning means, and visible directly above said aligning means;

said aligning means having one or more parallel spaced apart non-threaded round holes matching and generally centered in each of said projections and parallel to the longitudinal axis of said body, said holes having a diameter to receive a drill bit snugly, and said holes are located away from the center of said body to match existing axle holes in said model car; and, said projections position the axle hole of said model car coaxial with said aligning means.

* * * * *